United States Patent
Wong et al.

(10) Patent No.: US 6,716,485 B2
(45) Date of Patent: Apr. 6, 2004

(54) INTUMESCENT ABLATIVE COMPOSITION

(75) Inventors: Jim L. Wong, Diamond Bar, CA (US); Velimir Jovanovic, San Diego, CA (US)

(73) Assignee: The Boeing Company, Chicago, IL (US)

(*) Notice: Subject to any disclaimer, the term of this patent is extended or adjusted under 35 U.S.C. 154(b) by 281 days.

(21) Appl. No.: 09/892,420

(22) Filed: Jun. 27, 2001

(65) Prior Publication Data

US 2003/0003306 A1 Jan. 2, 2003

(51) Int. Cl.$^7$ .............................. B05D 1/36; B32B 3/00
(52) U.S. Cl. .................... 427/402; 427/226; 427/227; 427/228; 427/372.2; 427/415; 427/421
(58) Field of Search ................................ 427/402, 415, 427/421, 372.2, 226, 227, 228

(56) References Cited

U.S. PATENT DOCUMENTS

| | | | |
|---|---|---|---|
| 3,380,941 A | 4/1968 | Dittmann et al. ............ 523/179 |
| 4,031,059 A | 6/1977 | Strauss .................... 260/37 SB |
| 4,077,921 A | 3/1978 | Sharpe et al. ............. 260/2.5 B |
| 4,204,899 A | 5/1980 | Walker et al. ............... 156/212 |
| 4,595,714 A | 6/1986 | McAllister et al. .......... 523/179 |
| 4,632,865 A | * 12/1986 | Tzur ........................ 428/304.4 |
| 4,658,728 A | * 4/1987 | Amos et al. ................. 102/501 |
| 4,772,495 A | 9/1988 | Headrick et al. ............ 427/386 |
| 4,837,250 A | 6/1989 | Headrick et al. ............ 523/179 |
| 4,888,057 A | 12/1989 | Nguyen et al. ........... 106/18.12 |
| 5,064,868 A | 11/1991 | Simpson et al. .............. 521/54 |
| 5,603,990 A | * 2/1997 | McGinniss et al. ....... 427/393.3 |
| 5,661,198 A | 8/1997 | Inatani et al. ................ 523/179 |
| 5,900,281 A | * 5/1999 | Deogan et al. .......... 427/393.3 |

* cited by examiner

*Primary Examiner*—Brian K. Talbot
*Assistant Examiner*—Elena Tsoy
(74) *Attorney, Agent, or Firm*—Harness Dickey & Pierce P.L.C.

(57) ABSTRACT

An ablative composition and methods of forming ablative structures are provided that improve char during ablation, prevent combustion during ablation, and which reduce moisture absorption of low temperature ablative (LTA) materials. The ablative composition comprises an intumescent material such as ammonium polyphosphate (APP) that is disposed within an LTA material at the outer surface of the ablative composition. The intumescent material may also be added in increasing amounts throughout the LTA material such that a gradient of intumescent material is formed near the outer surface of the ablative composition for the required amount of thermal protection. Both the LTA material and the intumescent material are applied to a substrate, or an aerospace vehicle structure, preferably in layers using methods such as spray forming or hand troweling.

25 Claims, 2 Drawing Sheets

INTUMESCENT ABLATIVE COMPOSITION

FIELD OF THE INVENTION

The present invention relates generally to low temperature ablative compositions and more particularly to compositions comprising quantities of intumescent materials in addition to methods for mixing the compositions and forming ablative structures.

BACKGROUND OF THE INVENTION

Ablative materials have been used in a number of applications to protect and insulate objects that are subjected to extreme thermal conditions. More specifically, extreme thermal conditions in aerospace vehicles have been managed using a variety of techniques including insulation and radiant cooling, active cooling, conduction and convective cooling, and by phase change or ablative materials. Generally, ablative materials are applied to the affected aerosurfaces and/or substructure to absorb the radiant and convective heat and to insulate the vehicle from the extreme thermal environment.

Aerospace launch vehicles having solid rocket boosters generate high convective and radiant heat near the base region of main engines. To prevent damage from the high heat, structure near the engines is typically protected with a layer of low temperature ablative (LTA) material. The LTA material generally insulates the structure by absorbing the heat through an ablation process, wherein the LTA material forms a char and thereafter burns for a period of time. During exposure to extreme heating and subsequent ablation, the LTA material may decompose and recede across its surface. The recession is generally due to phase change processes such as melting, sublimation, or chemical reactions including oxidation and combustion. Similarly, the decomposition is due to processes such as pyrolysis, phase changes, or chemical reactions.

The performance of LTA materials is often characterized by "q*" or "heat of ablation," which is defined as:

$q^* = qdot/mdot$;

where:

$qdot = q_{hw} - q_{rad}$; (net heat flux)

$q_{hw}$ = convective hot wall flux;

$q_{rad}$ = net radiative heat flux; and mdot = rate of mass loss.

In order to adequately protect structure and systems from extreme thermal conditions, LTA materials must have a high heat of ablation in addition to low thermal conduction. Furthermore, LTA materials in aerospace applications typically have a low density in order to minimize weight, and are further able to withstand a variety of flight loads, such as aerodynamic shear forces, in addition to extreme heating.

When LTA materials are exposed to high heat flux and oxygen from the atmosphere, the LTA materials quickly char and begin burning. Once ignited, the LTA materials may continue to burn even after the heat source subsides. Accordingly, effective LTA materials typically form a strong char during the ablation process, which is sufficient to prevent separation of at least a portion of the LTA material from the structure due to aerodynamic forces, thermal shock, and vibrations.

Generally, the char provides increased thermal protection because less LTA material is removed during the ablation process. The char is also porous, lightweight, and has low thermal conductivity to further improve thermal protection. Additionally, radiant heat loss is increased since the char has higher emissivity and can withstand higher temperatures, and the higher temperatures further reduce convective heat gain.

Unfortunately, a critical failure mode of LTA materials is the formation of a weakened char. As the material forms a char and burns during the ablation process, cracks may form in the surface of the LTA materials. The cracks typically increase in size over time and eventually cause the LTA material to fracture and erode away due to aerodynamic forces. Therefore, effective LTA materials must be capable of forming a strong char.

LTA materials are also susceptible to moisture absorption due to their porosity and lightweight. Moisture absorption increases the weight of the LTA material and further contributes to weakened char during the ablation process. Accordingly, a thin layer of sealant or paint, such as Corlar®, is applied over the top of the LTA materials, as a coating, to reduce moisture absorption. Unfortunately, the application of a sealant or paint increases the weight of the ablative composition, and further increases manufacturing cycle time and overall costs.

In addition to LTA materials, intumescent materials have also been used in high heat applications. Intumescent materials, generally defined as materials that swell when heated, have been used extensively as thermal barriers in the chemical and oil industries for fire protection. Unfortunately, intumescent materials have a high density and have been undesirable for use in weight sensitive applications such as in aerospace vehicles. Furthermore, the char that is produced by intumescent materials after being subjected to flames cannot withstand high aerodynamic shear forces.

Accordingly, there remains a need in the art for a lightweight ablative composition and methods of forming ablative structures that reduces the amount of ablation, strengthens the char, and protects the LTA against moisture absorption while improving manufacturability and reducing overall costs.

SUMMARY OF THE INVENTION

In one preferred form, the present invention provides an ablative composition that comprises a quantity of fire retarding intumescent material disposed within a low temperature ablative (LTA) material. To form an ablative structure, a quantity of LTA material is first applied to a substrate, such as an aerospace vehicle structure. An intumescent material is then mixed with a further quantity of LTA material, and the mixture is applied to the substrate, over the top of the first quantity of LTA material. Accordingly, intumescent material is disposed within the LTA material at the outer surface of the ablative structure, or ablative composition, to provide the requisite amount of thermal protection.

Preferably, the intumescent material is mixed with the LTA material during a spray forming process, wherein the LTA material is first deposited onto a substrate in streams during multiple passes of several spray heads to form an ablative structure. The intumescent material is then added to the LTA material during the final pass of the spray heads at the outer surface of the ablative composition.

Alternately, other known methods may be employed to apply the ablative composition to the substrate, such as manual troweling or pre-forming followed by a secondary bonding operation to the substrate. In addition, the ablative composition is cured onto the substrate, preferably at room temperatures, for a period of time that depends on the materials used and the amount of thermal protection required.

In another preferred form, the intumescent material is added to the LTA in increasing amounts towards the outer surface of the ablative composition, thereby forming a gradient of intumescent material. An increased amount of intumescent material is added to the LTA in each successive layer as layers of material are applied to the substrate using, for example, spray forming or manual troweling methods. As a result, the amount of intumescent material gradually increases towards the outer surface of the ablative composition for the required amount of thermal protection.

Under extreme thermal conditions, the intumescent material causes the LTA material to swell, and as a result, the LTA expands outward to block radiant heat and further expands inward to back-fill minor cracks. The swelling further prevents external heating and ambient oxygen from reaching the structure beneath the ablative composition. Advantageously, a stronger char is formed and the structure is adequately protected from the high heat.

Preferably, the LTA material is cork-based and further comprises epoxy. Additionally, the intumescent material is preferably ammonium polyphosphate (APP). The APP is added in a percentage between approximately 10% and 50% to the LTA, and the thickness of each layer applied to the substrate is between approximately 0.05 inches and 0.75 inches. Furthermore, the LTA and intumescent materials are cured at room temperature for approximately 10 minutes to approximately 24 hours, and preferably between approximately 1 and 4 hours. The amount of LTA and intumescent materials, and further the total thickness of the ablative composition, depends on the desired amount of thermal protection as described in greater detail below.

By adding the intumescent material to the LTA during the forming process, the added step of applying a coating of sealant or paint to prevent moisture absorption is eliminated. The ablative composition of the present invention further reduces the amount of ablation, strengthens the char on the surface of the ablative structure, and protects the LTA against moisture absorption.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
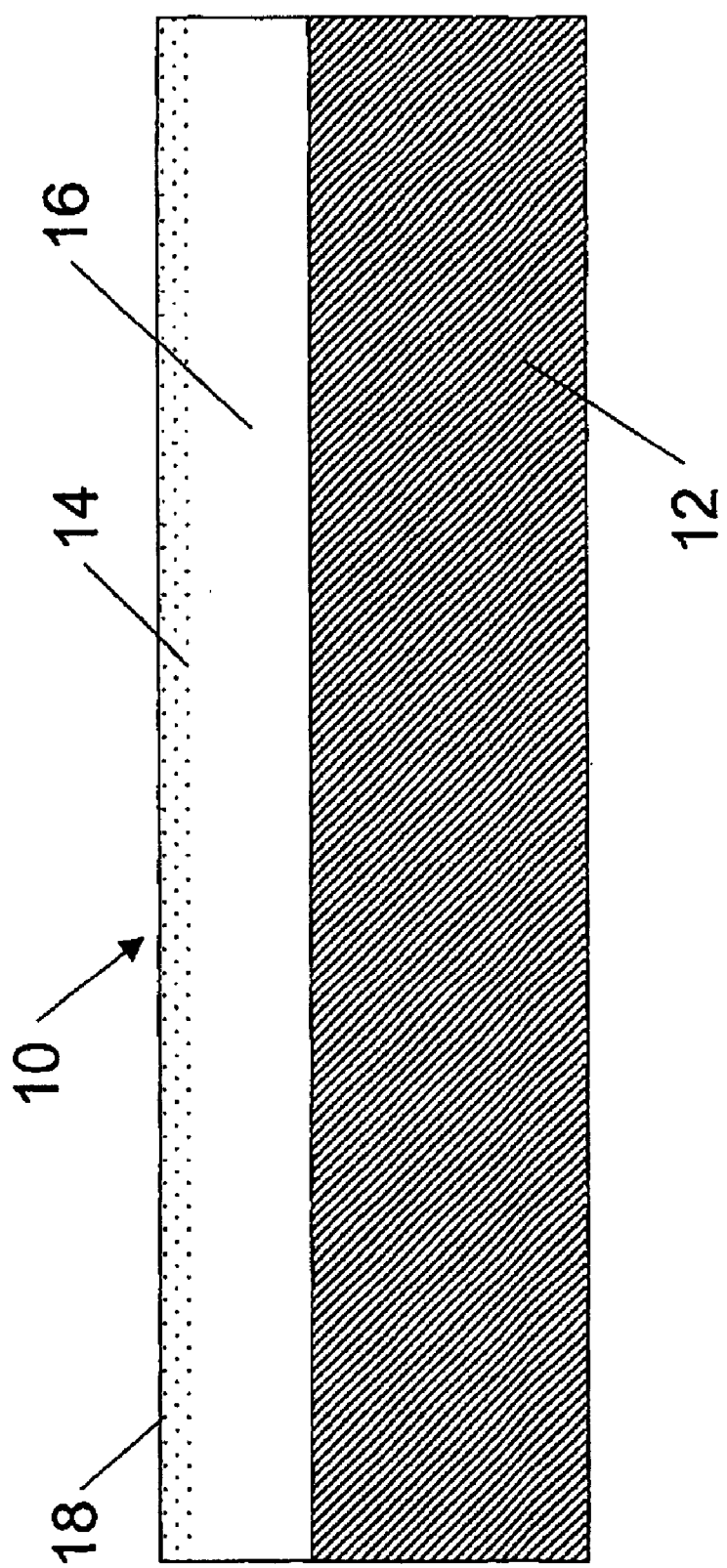
FIG. 1 is a side sectional view of a layer of intumescent material disposed within a low temperature ablative material in accordance with the present invention.

Referring to the drawings, the ablative composition of the present invention is illustrated and generally indicated by reference numeral 10 in FIG. 1. As shown, ablative composition 10 is applied to a substrate 12, which may be the structure of an aerospace vehicle that is subjected to extreme thermal conditions. The ablative composition 10 generally comprises an intumescent material 14 disposed within a low temperature ablative (LTA) material 16.

The application of the ablative composition 10 to an aerospace vehicle should not be construed as limiting the invention; rather the application to aerospace is merely illustrative of one structure and one operating environment in which the present invention has particular utility. The ablative composition of the present invention can further be employed with a wide variety of objects that must withstand high thermal loads for an extended duration.

To form an ablative structure, a first quantity of LTA material 16 is first applied to the substrate 12. The intumescent material 14 is then mixed with a further quantity of LTA material 16, and the mixture is then applied to the substrate 12 over the top of the first quantity of LTA material 16. Accordingly, the intumescent material 14 is disposed within the LTA material 16 at the outer surface 18 of the ablative composition 10 for the requisite amount of thermal protection.

Preferably, the LTA material 16 is applied to the substrate 12 in layers using spray forming methods. However, LTA material 16 may also be applied to substrate 12 using other known methods in the art such as manual troweling or pre-forming followed by adhesive bonding to the substrate 12. After a sufficient amount of LTA material 16 is applied to the substrate 12, the intumescent material 14 is then added to LTA material 16 and applied in a final layer. The final layer may be applied during the final pass of a spray head, or multiple spray heads, such that the intumescent material 14 is disposed within the LTA material 16 at the outer surface 18 of ablative composition 10.

After the LTA material 16 and the intumescent material 14 have been applied to the substrate 12, the ablative composition 10 is cured for a predetermined amount of time. Preferably, the ablative composition is cured at room temperature for approximately 10 minutes to approximately 24 hours, and more specifically between approximately 1 and 4 hours. It shall be appreciated by those skilled in the art that the cure temperature and time are a function of the type of materials used for the LTA material 16 and the intumescent material 14.

Preferably, the intumescent material 14 is ammonium polyphosphate (APP) and the LTA material 16 is a cork epoxy such as MCC-1. The percentage of intumescent material 14 that is added to the LTA material 16 is between approximately 10 percent and 50 percent. Preferably, the percentage of intumescent material 14 is between approximately 25 percent and 30 percent. Additionally, the thickness per pass of ablative composition 10 is between approximately 0.05 inches and 0.75 inches. Preferably, the thickness per pass of ablative composition 10 is approximately 0.25 inches.

The total amount of ablative composition 10 that is applied to the substrate 12 depends on the amount of thermal protection required and the particular LTA 16 material applied. One preferred embodiment of the present invention comprises an MCC-1 LTA material and an APP intumescent material, wherein the ablative composition 10 has a total thickness of approximately 0.75 inches. The ablative composition 10 was designed and tested to protect a graphite epoxy substrate subjected to plumes of the Delta IV Medium-Plus (M+) solid rocket boosters. Generally, the required amount of LTA material 16 and intumescent material 14 are determined by experimental testing in a controlled environment.

Preliminary testing of the ablative composition 10 according to the present invention resulted in a reduction in the amount of ablation by approximately 30 to 50 percent. The test conditions simulated a Delta IV M+ vehicle trajectory and corresponding thermal environment. The amount of intumescent material 14 disposed within the LTA material 16 was formulated to block the simulated plume for approximately 10 seconds in a high heat flux, but low shear environment. After approximately 10 seconds, the vehicle is at a sufficient altitude such that the reduced amount of oxygen will suppress the flame. Further, after approximately 20 seconds, the ambient oxygen does not support combustion. Accordingly, further preliminary testing has shown that preventing the ablative composition 10 from igniting during approximately the first 5 seconds results in lower heat flux during flight and a reduced thickness of LTA material.

Figure 2:
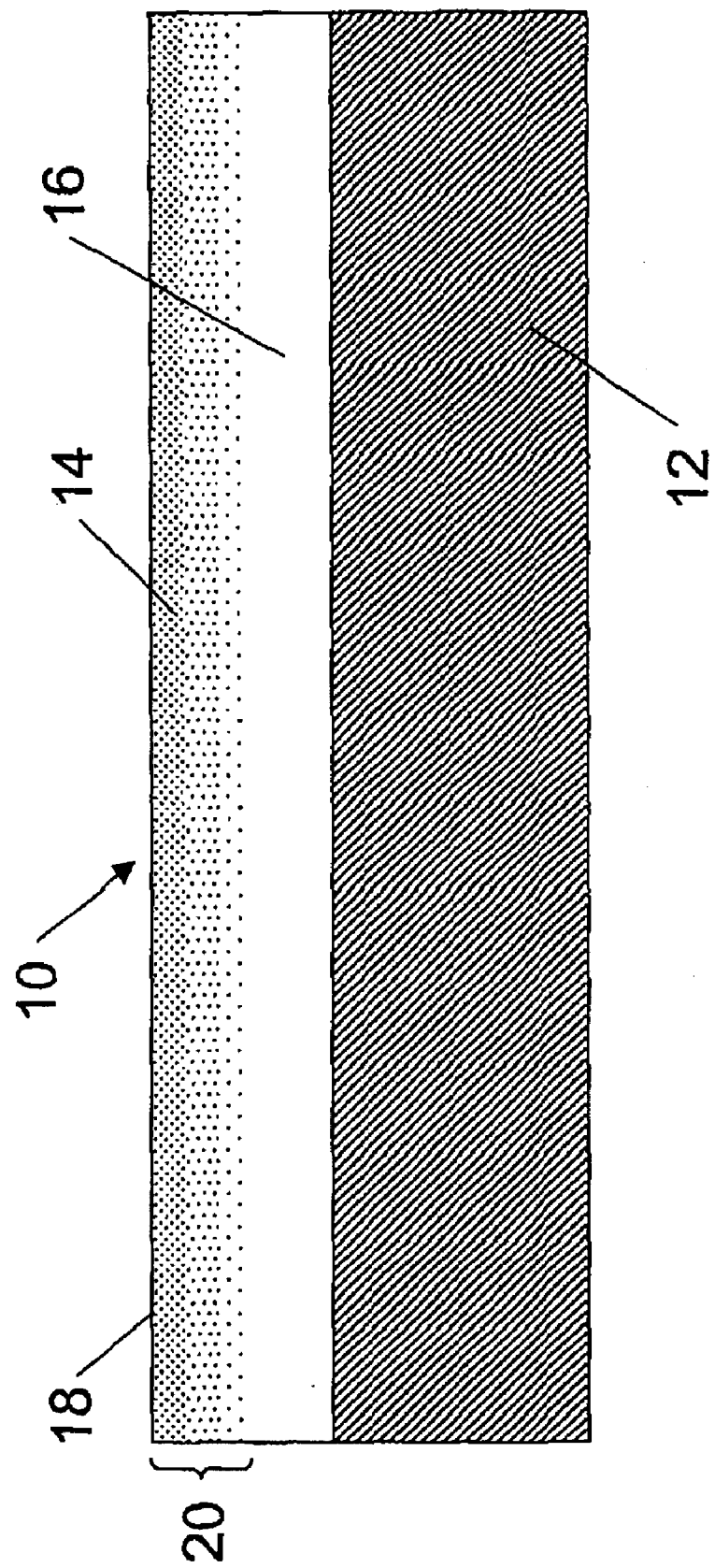
FIG. 2 is a side sectional view of intumescent material disposed within a low temperature ablative material to form a gradient of intumescent material near the outer surface of the ablative composition in accordance with the present invention.

In another preferred form of the present invention, intumescent material 14 is added to LTA material 16 in increasing amounts with each pass or layer, such that a gradient 20 of intumescent material 14 is formed at the outer surface 18 of ablative composition 10 as shown in FIG. 2. The ablative composition 10 similarly undergoes a curing process as previously described to form the completed ablative structure. Depending on the amount of thermal protection required, therefore, the amount of intumescent material 14 can be tailored for an adequate amount of thermal protection.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of forming an ablative structure, the method comprising the steps of:
   (a) applying to a substrate a first quantity of a low temperature ablative material that is absent an intumescent material;
   (b) mixing an intumescent material with a second quantity of the low temperature ablative material; and
   (c) applying the intumescent material mixed with the second quantity of the low temperature ablative material over the first quantity of the low temperature ablative material.

2. The method of claim 1, wherein the low temperature ablative material and the intumescent material are applied to the substrate using spray forming.

3. The method of claim 2, wherein the intumescent material mixed with the quantities of low temperature ablative material is between approximately 0.05 and 0.75 inches thick.

4. The method of claim 3, wherein the intumescent material mixed with the quantities of low temperature ablative material is approximately 0.25 inches thick.

5. The method of claim 1, wherein the intumescent material is mixed between approximately 10 and 50 percent by weight with the low temperature ablative material.

6. The method of claim 5, wherein the intumescent material is mixed between approximately 25 and 40 percent by weight with the low temperature ablative material.

7. The method of claim 1 further comprising the step of curing the low temperature ablative material and the intumescent material onto the substrate.

8. The method of claim 7, wherein the low temperature ablative material and the intumescent material are cured at room temperature.

9. The method of claim 8, wherein the low temperature ablative material and the intumescent material are cured onto the substrate between approximately 10 minutes and 24 hours.

10. The method of claim 9, wherein the low temperature ablative material and the intumescent material are cured onto the substrate between approximately one and 4 hours.

11. The method of claim 1, wherein the intumescent material is ammonium polyphosphate.

12. The method of claim 1, wherein the low temperature ablative material is cork-based.

13. A method of forming an ablative structure, the method comprising the steps of:
   (a) applying a first quantity of low temperature ablative material to a substrate;
   (b) mixing a first quantity of intumescent material with a second quantity of low temperature ablative material;
   (b) applying the first quantity of intumescent material mixed with the second quantity of low temperature ablative to the substrate on top of the first quantity of low temperature ablative material;
   (c) mixing further quantities of intumescent material with further quantities of low temperature ablative material; and
   (d) applying the further quantities of intumescent material mixed with the further quantities of low temperature ablative material to the substrate on top of the first quantity of intumescent material mixed with the second quantity of low temperature ablative material,
   wherein the further quantities of low temperature ablative material are successively less than the second quantity of low temperature ablative material, such that the intumescent material is applied in an increasing amounts, thereby forming a gradient of intumescent material.

14. The method of claim 13, wherein the quantities of low temperature ablative material and the quantities of intumescent material are applied to the substrate using spray forming.

15. The method of claim 14, wherein the quantities of intumescent material mixed with the quantities of low temperature ablative material is between approximately 0.05 and 0.75 inches thick.

16. The method of claim 15, wherein the quantities of intumescent material mixed with the quantities of low temperature ablative material is approximately 0.25 inches thick.

17. The method of claim 13, wherein the intumescent material is mixed between approximately 10 and 50 percent by weight with the low temperature ablative material.

18. The method of claim 17, wherein the intumescent material is mixed between approximately 25 and 40 percent by weight with the low temperature ablative material.

19. The method of claim 13 further comprising the step of curing the low temperature ablative material and the intumescent material onto the substrate.

20. The method of claim 19, wherein the low temperature ablative material and the intumescent material are cured at room temperature.

21. The method of claim 20, wherein the low temperature ablative material and the intumescent material are cured onto the substrate between approximately 10 minutes and 24 hours.

22. The method of claim 21, wherein the low temperature ablative material and the intumescent material are cured onto the substrate between approximately one and 4 hours.

23. The method of claim 13, wherein the intumescent material is ammonium polyphosphate.

24. The method of claim 13, wherein the low temperature ablative material is cork-based.

25. A method of forming an ablative structure, the method comprising the steps of:

(a) mixing a quantity of intumescent material with a low temperature ablative material, wherein the intumescent material is disposed within the low temperature ablative material in increasing amounts towards an outer surface of the ablative structure, thereby forming a gradient of intumescent material; and (b) applying the quantity of intumescent material mixed with the low temperature ablative material to a substrate.

* * * * *